United States Patent Office 3,280,777
Patented Oct. 25, 1966

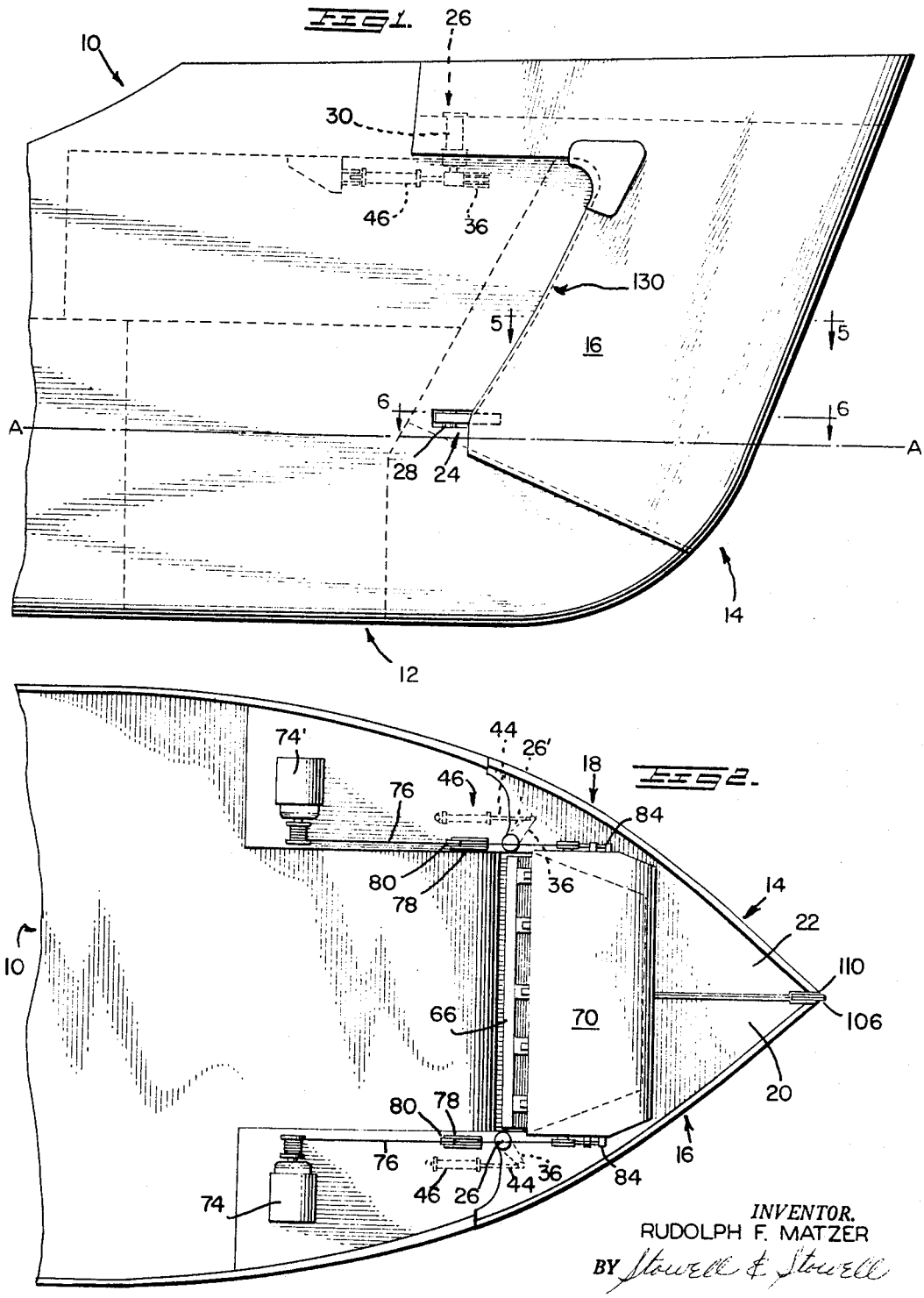

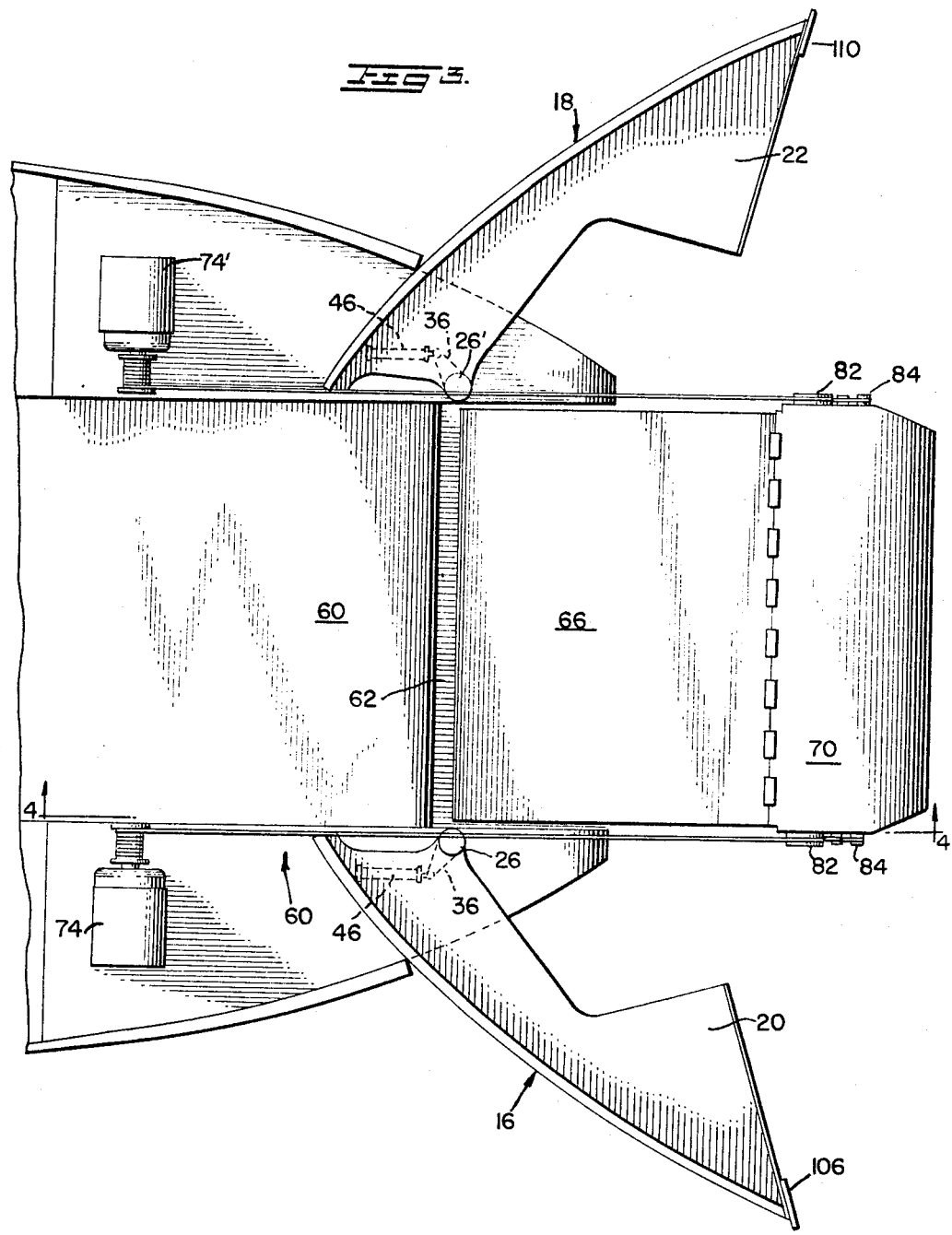

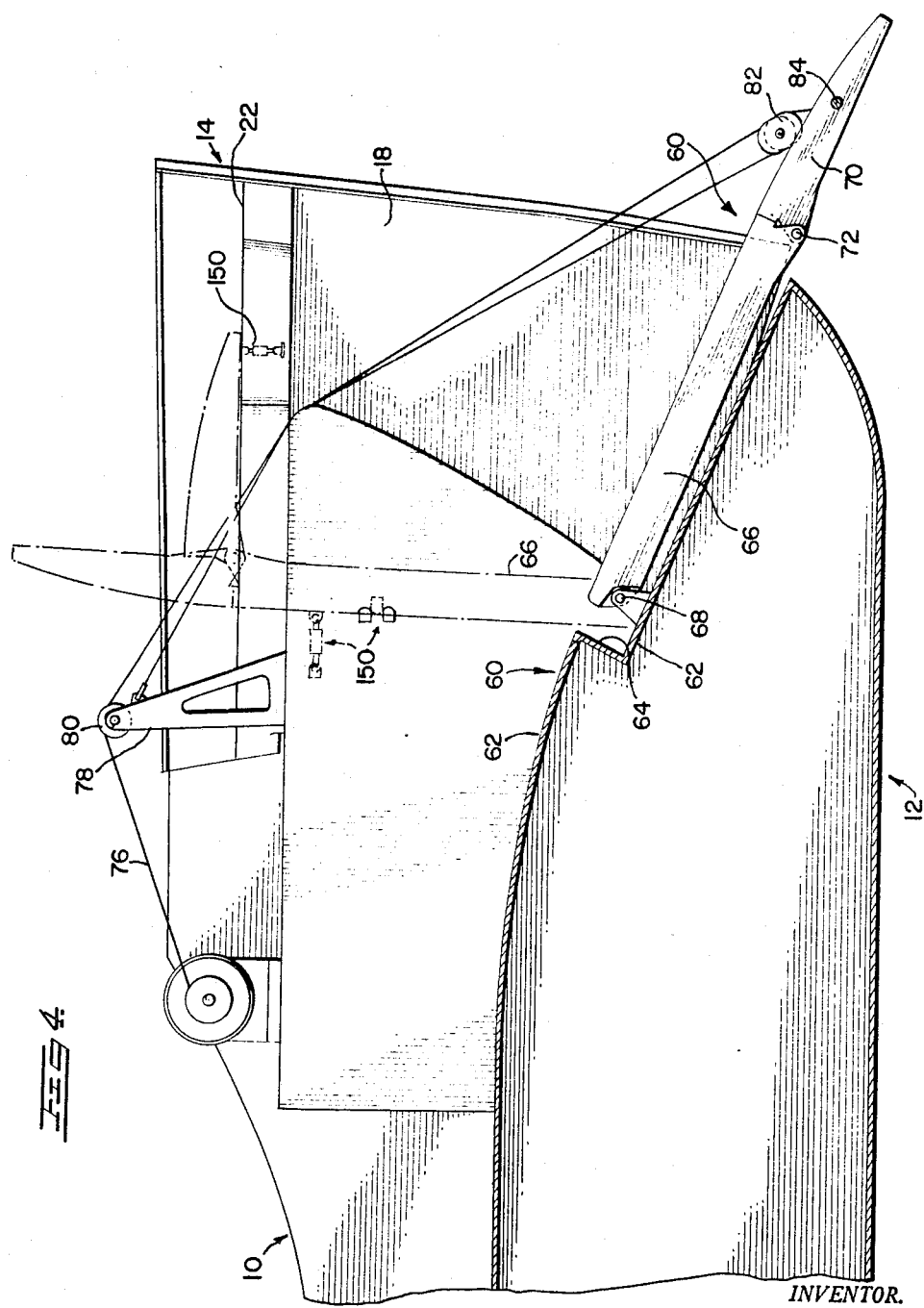

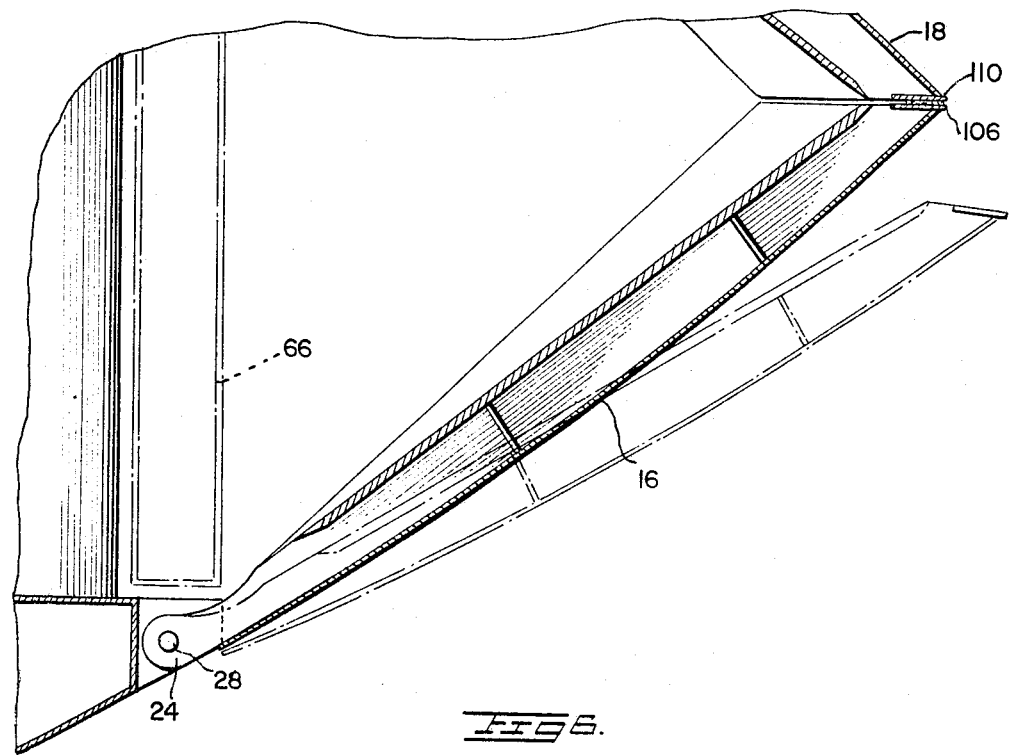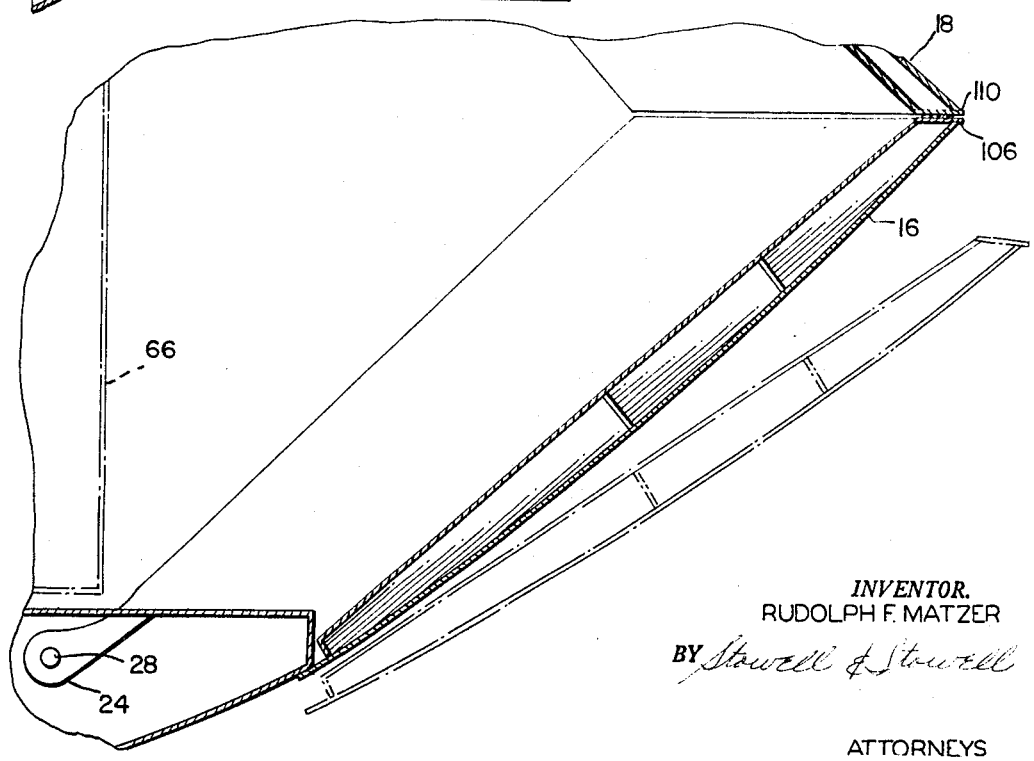

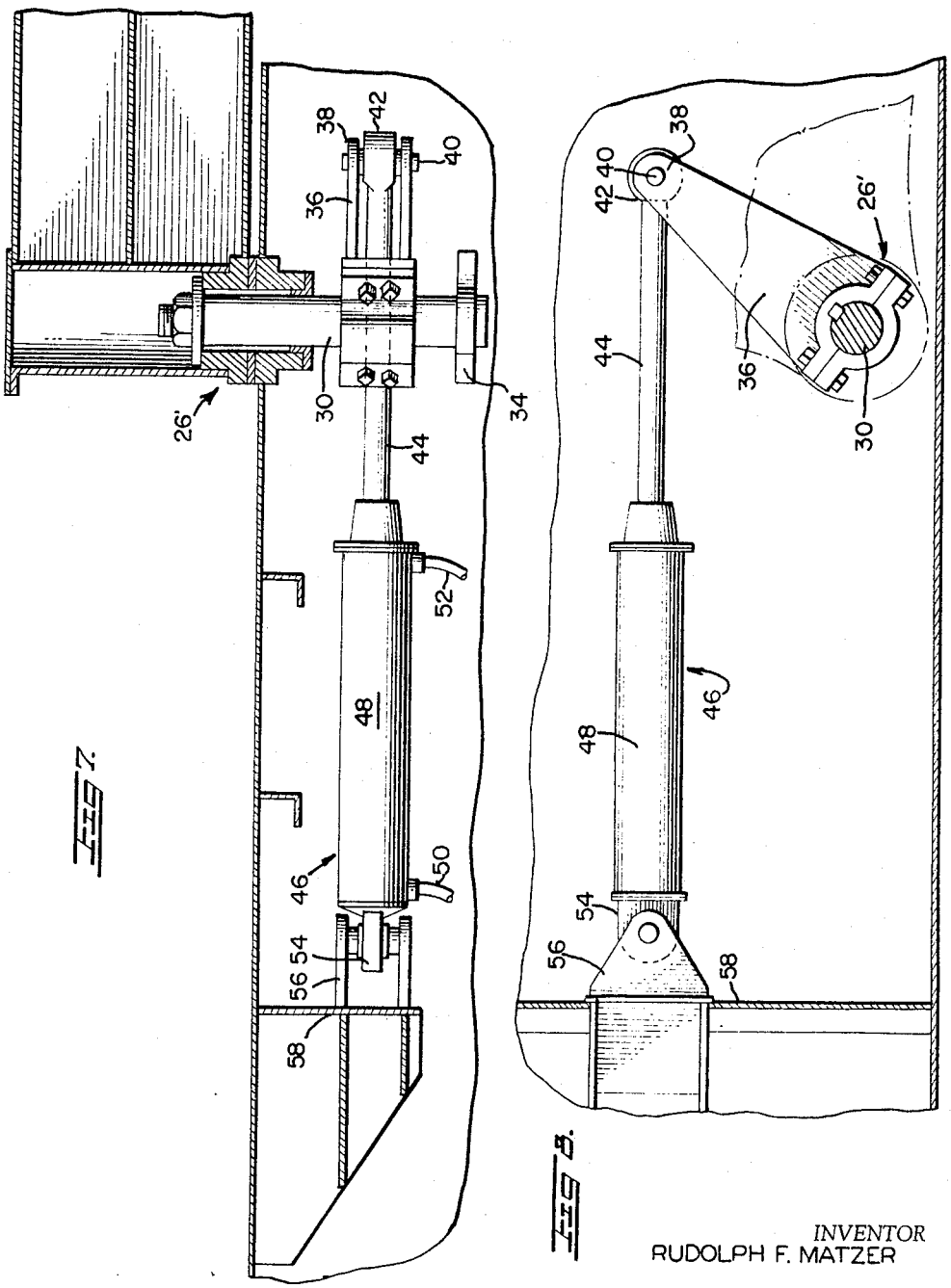

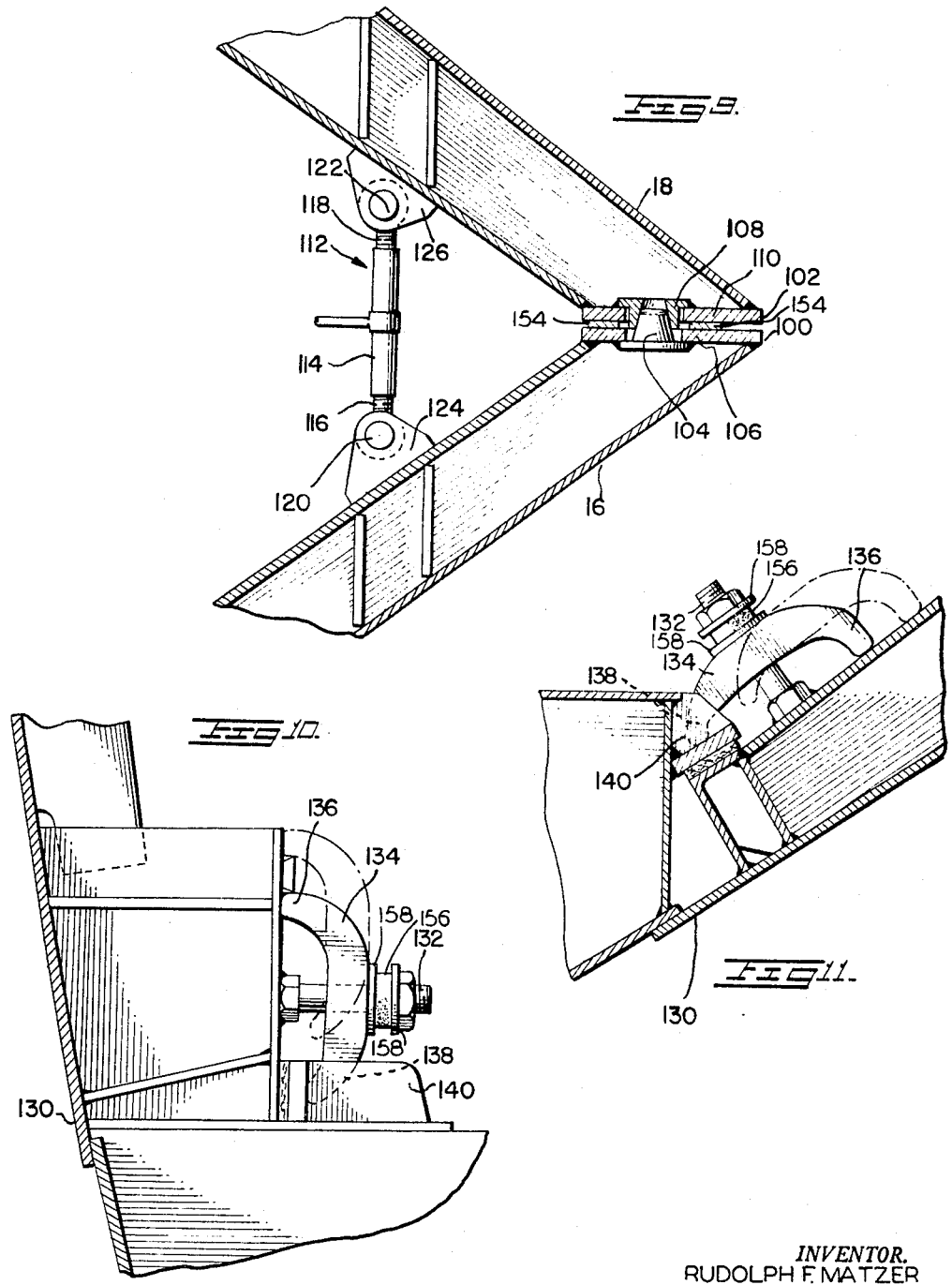

3,280,777
INTEGRATED RAMP DOORS FOR SHIP
Rudolph F. Matzer, Jacksonville, Fla., assignor to West India Shipping Company, Inc., West Palm Beach, Fla., a corporation of Florida
Filed July 2, 1965, Ser. No. 469,108
4 Claims. (Cl. 114—70)

This invention relates to improvements in the design and construction of large ships and vessels such as those employed in ocean commerce, and more particularly to an improved loading ramp and bow door arrangement which substantially improves the sea-worthiness of ships, improves the speed of discharge and loading of cargo and permits loading and unloading of wider cargo.

It is an object of the present invention to provide such a ship having a ramp associated with bow doors whereby when the bow doors are open the ramp may be extended therethrough to provide for the efficient loading and unloading of the ship.

It is a further object of the invention to provide an improved sea-going ship having integrated ramp and bow doors which bow doors form a portion of the forecastle deck when lock-closed resulting in an extremely rigid and sturdy construction which sheds sea water.

These and other objects and advantages are provided in a ship having a peak bow, the bow being formed by a pair of generally laterally opening doors, the outer wall of each of the doors forming the outer skin of its side of the ship's bow portion, the top surface of the doors extending laterally inwardly to form a portion of the forecastle deck, a fixed ramp portion and a pivotally mounted ramp portion cooperating to provide an integrated loading ramp for the ship, the pivotally mounted portion of the ramp having pivotal connection to the fixed ramp portion and movable from a vertical stowed position adjacent the rearward end of the bow doors to an inclined position of extension through the open doors and a leading end element pivotally mounted to the extended end of the pivotally mounted ram portion, the leading end element being adapted to overlay and be secured to the forecastle deck portion formed by the laterally inwardly extending portions of the bow doors.

The invention will be more particularly described in reference to the accompanying drawings wherein:

FIG. 1 is a fragmentary view of a ship bow constructed in accordance with the teachings of this invention;

FIG. 2 is a top plan view of the structure illustrated in FIG. 1;

FIG. 3 is a view similar to that illustrated in FIG. 2 with the bow doors and the ramp in the cargo loading and unloading position;

FIG. 4 is a section on line 4—4 of FIG. 3;

FIG. 5 is a section on line 5—5 of FIG. 1;

FIG. 6 is a section on line 6—6 of FIG. 1;

FIG. 7 is an enlarged fragmentary side view of one of the door actuating means;

FIG. 8 is an enlarged fragmentary view in plan of the actuating mechanism illustrated in FIG. 7;

FIG. 9 is an enlarged fragmentary view of latching means for the bow doors;

FIG. 10 is an enlarged view of further latching means for the integrated ramp and bow door construction of the invention; and FIG. 11 is another enlarged fragmentary view of the locking means for the bow doors.

Referring to the drawings, 10 generally designates an ocean-going ship having a hull portion 12 and a bow portion 14. In FIGS. 1 and 4, the broken line A generally designates the full load waterline of the vessel.

The bow portion of the vessel is composed of a pair of bow doors generally designated 16 and 18. Each bow door has a laterally extending portion 20 and 22, respectively, which laterally extending portions form a portion of the forecastle decking of the vessel. The outer surface of each of the bow doors forms a continuation of the outer shell or hull of the vessel when the doors are in the closed position as illustrated, for example, in FIG. 1 and 2.

Each door is hinged to the vessel proper by hings assemblies generally designated 24, 26 and 24' and 26'. Hinge pins 28 and 30 of the hinge assemblies 24, 24', 26 and 26', are so positioned that as the doors open, as illustrated in FIGS, 3, 5 and 6, the lower portion of the bow doors swing outwardly to clear the hull of the ship, while the upper portions fold inwardly to a line which would form a continuation of the ramp for the vessel.

The upper hinge pins 26 are secured to the bow doors and project downwardly to lower fixed pivots or pillow blocks 34 more clearly illustrated in FIG. 7 of the drawings. The extended portion of each of the hinge pins 30 has a crank arm 36 keyed thereto. The extended end 38 of each crank arm 36 is pivotally connected by pin 40 to the extended end 42 of a piston rod 44. Each piston rod 44 is associated with a hydraulic ram 46 which includes ram cylinder 48.

Opposite ends of each ram cylinder 48 connect at 50 and 52 to a pressurized source of hydraulic fluid through suitable valve means not shown in the drawings. The rearward end 54 of each ram 46 is pivotally mounted to a clevis 56 secured to a bulkhead portion 58 of the vessel. With this arrangement as hydraulic fluid is directed through conduit 52 to the head end of each ram 46, its piston rod 44 is drawn inwardly and crank arm 36 attached thereto rotates hinge pin 30 to swing the doors to the open position. Reversal of the direction of flow of pressure fluid in the rams 46 closes the doors.

Now referring particularly to FIGS. 3 and 4, the vessel is equipped with a cargo ramp generally designated 60. A portion of the ramp 62 is made integral with the vessel during its construction. Adjacent the forward end of the fixed ramp 62 is an offset portion 64 and adjacent to the offset portion 64 there is pivotally mounted a movable ramp 66 which movable portion may be pivoted on pivot pins 68 from a loading position shown in full lines in FIG. 4 to a folded storage position as illustrated in phantom lines in FIG. 4. The extended end 70 of the movable portion of the ramp 66 is pivoted on pins 72 for independent movement also as illustrated in FIGS. 2 and 4. The movable ramp 66 is moved from its loading position to its storage position by a pair of winches 74 and 74' having rigging which includes flexible draft means 76, standards 78, pulleys 80 and pulley blocks 82 which are pivotally connected to the forward end of the extended portion 70 of the movable ramp on pins 84.

It will be particularly noted from FIGS. 2 and 4 that when the movable ramp portion 66 is moved to its phantom line vertical position, the extended end 70 thereof may then be lowered to provide a continuation of the forecastle deck formed by the lateral element 20 and 22 of each of the bow doors, thereby, when it is locked in this position, providing a very rigid construction for the ship.

It will also be particularly noted that it is not necessary that the bow doors 16 and 18 close to provide a watertight joint because the fixed ramp 60 of the vessel slopes upwardly in continuous manner to a position above the water line of the vessel whereby any water entering the closed bow doors is prevented from entering the ship's hold by the watertight construction between the fixed ramp 62 and side bulkheads of the ship. With this arrangement vessels constructed in accordance with the teachings of the present invention are classed sea-worthy for ocean passage even though the bow doors when closed are not water-tight.

Referring particularly to FIGS. 9, 10 and 11, various means for securing the bow doors in the closed position are illustrated. In FIG. 9 the meeting edges 100 and 102 of bow doors 16 and 18, respectively, are maintained in alignment by generally conical members or pins 104 welded to a vertical element 106 of door 16. A conical socket 108 is similarly welded to vertical member 110 of door 18 so that when doors are closed the conical pin 104 is in locking engagement with the cooperating bore in socket 108. A plurality of such elements positioned along cooperating members 106 and 110 provide positive mating closure of the doors. Further each of the doors is maintained in the closed position by at least one tie bolt generally designated 112. The tie bolt 112 includes a threaded coupler 114 and a pair of threaded pins 116 and 118, each of which is pivotally mounted by pins 120, 122 to portions 124 and 126 on their respective bow doors. By rotating the threaded coupling 114 the two threaded pins 116 and 118 are drawn toward each other securely locking the doors in their closed position. Further latching means are shown in FIGS. 10 and 11, such latching means are positioned at spaced intervals along the trailing edges 130 of each of the bow doors. Each latching means comprises a stud 132 welded to the inner surface of its respective bow door and a lug 134, having one end 136, which is adapted to bear against the inner surface of its door and one end 138 which is adapted to be received in a latching plate 140 secured to a fixed side wall of the ship. Similar aligning and latch means lock the extended end 70 of the ramp to elements 20 and 22 forming the forecastle deck and ramp portion 66 to fixed bulkheads of the ship as shown at 150.

It will be particularly noted that plates 106 and 110, FIG. 9, are not in surface to surface contact even when the bow doors 16 and 18 are closed. The plates are maintained in spaced relationship by one or more resilient pads or strips 154. The pads assist in maintaining the bow doors water tight; however, primarily they provide means for preventing the turnbuckles from becoming slack in heavy seas.

Similarly, the dogs or latching means shown in FIGS. 10 and 11 include resilient pads 156 spaced between a pair of washers 158 which prevent the latching lugs 134 of the dog type latches from becoming slack after the associated nuts are tightened to compress the pads 156.

In FIGS. 10 and 11 the latching means are shown in full lines in the latched position and in broken lines in the unlatched position.

The above description and drawings disclose a preferred embodiment of the invention and specific language has been employed in describing the several figures. It will be understood that no limitations of the scope of the invention are thereby contemplated and that various alterations and modifications may be made such as would occur to one skilled in the art in which the invention relates.

I claim:

1. In a ship having a peak bow, said bow being formed by a pair of generally laterally opening doors, the outer wall of each of the doors forming the outer skin of its side of the ship bow portion, the top surface of each of said bow doors extending laterally inwardly to form a portion of the forecastle deck, a fixed ramp portion and a pivotally mounted portion cooperating to provide an integrated loading ramp for the ship, said pivotally mounted portion having pivotal connection the the fixed ramp portion and movable from a vertical stowed position adjacent the rearward end of the bow doors to an inclined position of extension through the open doors, and a leading end element pivotally mounted to the extended end of the pivotally mounted ramp portion, said end element being adapted to overlay and be locked to the forecastle deck formed by the laterally inwardly extending portions of the bow doors.

2. The invention defined in claim 1 wherein the fixed ramp portion slopes upwardly above the water line of the ship and prevents entry of water into the hold of the ship.

3. The invention defined in claim 1 including aligning and latching means provided on each of said bow doors cooperating to maintain said doors in the normally closed position.

4. The invention defined in claim 1 including a pressure fluid ram connected to each of said bow doors and to the ship for opening and closing said bow doors.

No references cited.

MILTON BUCHLER, *Primary Examiner.*

T. M. BLIX, *Assistant Examiner.*